No. 674,275. Patented May 14, 1901.
A. W. MILLEN.
STOP FOR CUT-OFF SAWS.
(Application filed Oct. 1, 1900.)
(No Model.)
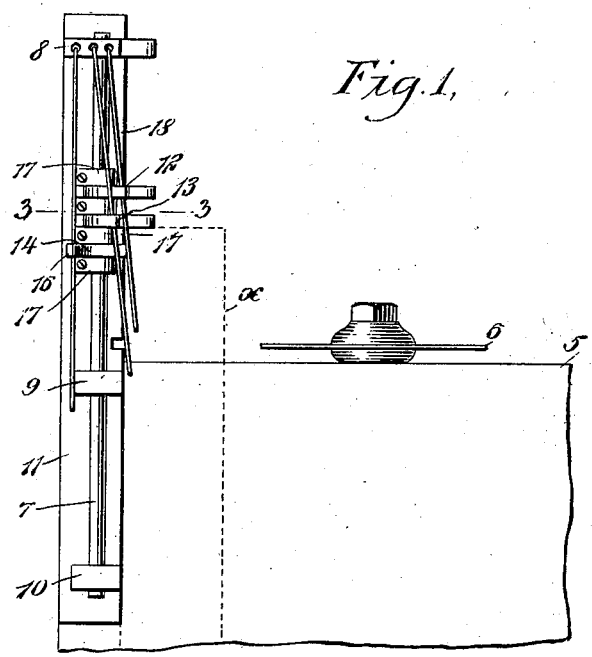
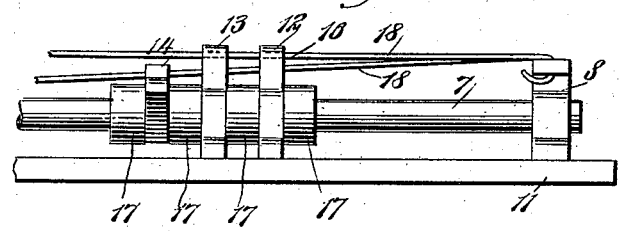
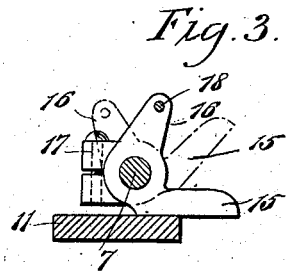
WITNESSES:
INVENTOR
ATTORNEYS

UNITED STATES PATENT OFFICE.

AMOS WEBSTER MILLEN, OF OVERTON, CALIFORNIA, ASSIGNOR OF ONE-HALF TO JOHN F. BUTLER, OF SAME PLACE.

STOP FOR CUT-OFF SAWS.

SPECIFICATION forming part of Letters Patent No. 674,275, dated May 14, 1901.

Application filed October 1, 1900. Serial No. 31,661. (No model.)

*To all whom it may concern:*

Be it known that I, AMOS WEBSTER MILLEN, a citizen of the United States, residing at Overton, in the county of Nevada and State of California, have invented a new and Improved Stop for Cut-Off Saws, of which the following is a full, clear, and exact description.

This invention relates to improvements in stops or gages used in connection with saws for cutting lumber into lengths for boxes or the like; and the object of the invention is to provide a stop that is simple in construction and that may be changed quickly for different lengths while the saw is in motion.

I will now describe a stop for cut-off saws embodying my invention and then point out the novel features in the appended claims.

Reference is to be had to the accompanying drawings, forming a part of this specification, in which similar characters of reference indicate corresponding parts in all the figures.

Figure 1 is a plan view of a stop embodying my invention. Fig. 2 is a front view thereof, and Fig. 3 is a section on the line 3 3 of Fig. 1.

Referring to the drawings, 5 designates a portion of the platform of a saw-frame, and 6 indicates a saw. At the forward end of the platform 5 is a bar 7. This bar is here shown mounted in uprights 9 and 10, which are attached to a headboard 11. Mounted to swing on the bar 7 are stops 12, 13, and 14. These stops, as is plainly indicated in Fig. 3, have gage or stop portions 15, adapted to be moved downward to be engaged by the end of a board, as indicated at *x*, and each stop has an arm 16 projected at substantially right angles to the portion 15. The stops are adjusted lengthwise of the bar 7, and they are held as adjusted by means of collars 17 on the bar. Each stop is moved to its position by means of a rod 18. The several rods 18 are connected at one end to the stop 8, attached to the end of the bar 7, and then extend loosely through holes in the arms 16 of the stops.

In operation a stop when swung downward to its operative position is held in such position by means of its own weight. When it is desired to place any stop in operative position for the purpose of sawing a greater length of board, the first stop—say the stop 13—will be swung backward, as indicated by the dotted lines in Fig. 3.

It is obvious that while I have shown but three stops a greater or lesser number may be employed. The end bracket 8 serves as a stop for long lengths and might be adjusted by moving the bar 7.

By this arrangement of stops the changes of different lengths of boards may be quickly made while the saw is in operation, thus saving materially in time and consequently in cost of production.

Having thus fully described my invention, I claim as new and desire to secure by Letters Patent—

1. For use in connection with a saw, a bar, a series of stops mounted to swing on the bar, a fixed stop, and swinging rods extended from the fixed stop and connecting with the swinging stops, substantially as specified.

2. For use in connection with a saw, a stop, a bar on which said stop is mounted to swing and also on which the stop is adjustable longitudinally of the bar, and a rod mounted to swing and having its free end extended through an arm of the stop, substantially as specified.

In testimony whereof I have signed my name to this specification in the presence of two subscribing witnesses.

AMOS WEBSTER MILLEN.

Witnesses:
A. W. MAY,
H. L. MOODY.